Feb. 18, 1958  M. MAINCON ET AL  2,824,049
PROCESS FOR THE SEPARATION OF DECOMPOSITION
PRODUCTS OF CUMENE HYDROPEROXIDE
Filed June 22, 1955
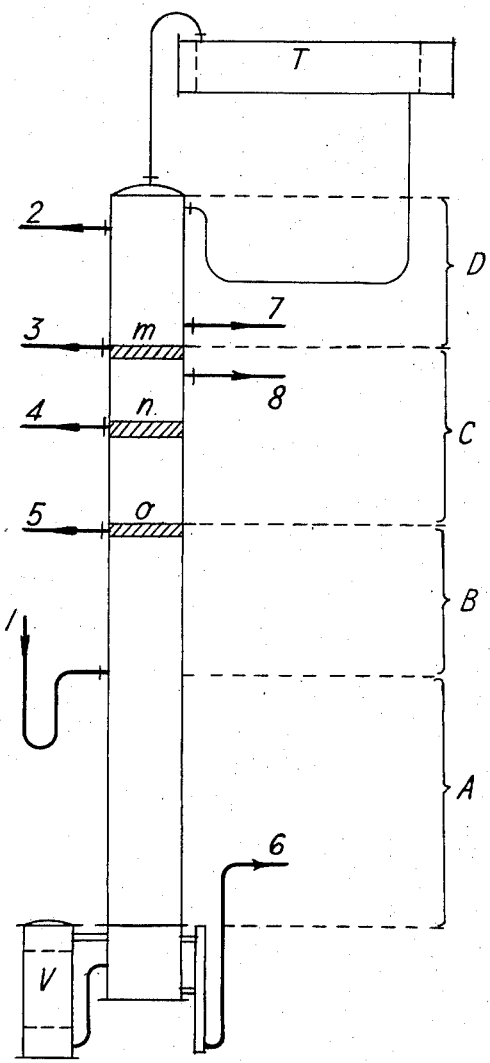
Inventors
Maurice Maincon
Maurice Fenoglio
André Pacault
By
Stevens, Davis, Miller & Mosher
their Attorneys United States Patent Office 2,824,049
Patented Feb. 18, 1958

2,824,049

PROCESS FOR THE SEPARATION OF DECOMPOSITION PRODUCTS OF CUMENE HYDROPEROXIDE

Maurice Mainçon, Chatou, Maurice Fenoglio, Lyon, and André Pacoud, St.-Fons, France, assignors to Societe des Usines Chimiques Rhone-Poulenc, Paris, France, a French body corporate Application June 22, 1955, Serial No. 517,216

Claims priority, application France June 23, 1954

10 Claims. (Cl. 202—42)

This invention relates to a process for the separation of the products obtained by catalytic decomposition of cumene hydroperoxide.

The fission products of cumene hydroperoxide contain, in addition to a mixture of acetone and phenol in substantially equimolecular proportions, smaller quantities of other products, including cumene, α-methylstyrene, dimethylphenyl carbinol, acetophenone, cumyl phenol and polymers of α-methylstyrene. The mixture also contains a quantity of dissolved water.

In the processes hitherto described for the separation of these products, the acetone is first separated in a distillation column and the residue thus obtained is then subjected to a series of extractions, distillations and other treatments to separate the phenol from the other products. If the operation is carried out by distillation, the products are separated in the order of their boiling points, that is to say, the hydrocarbons, the cumene and the methylstyrene are generally extracted in a second column and the phenol is left at the bottom of the said column in admixture with the heavier products. The phenol is withdrawn from the top of a following column and the heavier products, including acetophenone and dimethylphenyl carbinol are left as residue. These various distillations are accompanied by a more or less strong dehydration of the dimethylphenyl carbinol to yield methylstyrene, which complicates the process.

The acetone which is separated in the initial distillation is always impure since there are distilled therewith aqueous azeotropes of hydrocarbon, dimethylphenyl carbinol, acetophenone and phenol. Moreover, odorous, coloured and reducing impurities are present which collect between the zone of distillation of hydrocarbon-water azeotropes and the zone of distillation of the acetone and which tend to distil with the latter product and to entrain small quantities of hydrocarbons.

On the other hand, when the hydrocarbons (the cumene and the methylstyrene) are distilled after elimination of the acetone, the aforesaid azeotropes contaminate these hydrocarbons with phenol. In the known processes, the phenol content of the said hydrocarbons may range from 3% to 7%. The recovered hydrocarbons are intended primarily for re-use, the methylstyrene being hydrogenated and the cumene being re-oxidised to the hydroperoxide. However, the phenol contained in these hydrocarbons inhibits the oxidation of the cumene and it is, therefore, essential to eliminate it. This may be done by washing with alkaline solutions but it is a tedious operation.

According to the present invention a process for the separation of the fission products of cumene hydroperoxide containing phenol, acetone and other products including cumene, methylstyrene, dimethylphenyl carbinol and acetophenone, comprises subjecting said products to fractional distillation in a single plate-type distillation column in the presence of water, continuously withdrawing acetone from the head of the column, withdrawing the hydrocarbons together with water from intermediate plates of the column, said hydrocarbons being substantially free from phenol, and withdrawing phenol with dimethylphenyl carbinol and acetophenone but substantially free from acetone, cumene and methylstyrene from the base of the column.

According to a further feature of the present invention dimethylphenyl carbinol and acetophenone together with water, are also withdrawn from other intermediate plates in the column.

The process depends on the fact that the presence of water improves the coefficients of separation of the products present, on the fact that the various azeotropes, although boiling in relatively narrow temperature range can, nevertheless, be readily collected in a column having a sufficient number of plates, and on the fact that each product is afforded, in its zone, all the reflux necessary to ensure concentration of the acetone. Each of the azeotropes forms on the plates a form of barrier preventing the upward passage of less volatile products and permitting the withdrawal of substantially pure products.

In the absence of water, the acetophenone and the dimethylphenyl carbinol boil at a higher temperature than the phenol, but in the presence of water azeotropes are formed which boil at a lower temperature than the water-phenol azeotrope and consequently the water-acetophenone and water-dimethylphenyl carbinol azeotropes are confined to the plates above those bearing water-phenol azeotrope and thus assist in preventing the upward passage of the phenol.

Since the azeotropes of these various products are heterogeneous and it is desired to extract only a measured quantity of each of the layers, extractions are effected in external decanters or the column is provided with decanting plates situated at those points of the column at which the concentration of these azeotropes is maximum. The products which it is desired to extract are withdrawn in the desired quantity from the said decanters or decanting plates through lateral taps, and the surplus returns to the column.

The process is illustrated in the accompanying drawing, which shows a distillation column having a large number of plates and provided with the conventional accessories, that is to say, the evaporator V for supplying the necessary heat to the bottom and the condenser T for condensing the vapours leaving the column. In order to simplify the description, the column is divided into four zones designated, in the drawing, by the letters A, B, C and D. m, n and o represent decanting plates. The liquid to be treated is supplied through the pipe 1, and the liquids are withdrawn from the column through the pipes 2, 3, 4, 5, 6, 7 and 8.

The zone A, which is situated at the bottom of the column, receives at its upper part, at 1, the fission products of the cumene hydroperoxide, freed from the fission catalyst, while a quantity of heat at least sufficient to drive off the acetone is supplied to the lower part. When in operation, the plates, from the top downwards, contain a gradually decreasing quantity of acetone and of products forming aqueous azeotropes which boil at a lower temperature than the water-phenol azeotrope.

In the zone B, the quantity of phenol on the plates decreases from the bottom upwards and the upper plates contain a heterogeneous azeotropic mixture, the organic layer of which consists of a mixture of acetophenone, dimethylphenyl carbinol and hydrocarbons. This layer contains only traces of phenol.

At the top of the zone C, the aqueous azeotropes of cumene and methylstyrene collect and these are substantially free from phenol.

The zone D serves to concentrate the acetone. Since there is substantially no phenol present at the top of the zone C, the acetone condensed at the top of the column contains no phenol at all.

Thus, substantially pure acetone, free from phenol, is withdrawn from the top of the zone D at 2.

At the top of the zone C, hydrocarbons and water are withdrawn by means of the decanting plates $m$ and $n$, the hydrocarbons being withdrawn in a quantity equal to that introduced into the column in the liquid supplied at 1, but preferably only a part of the water being withdrawn, so that there is always left in the column a quantity of water sufficient to produce the various azeotropes. The hydrocarbons are substantially free from phenol.

One or more extractions may be made from the bottom of the zone D through the pipe 7 and from the top of the zone C through the pipe 8, where the odorous, coloured or reducing compounds are concentrated.

A layer rich in acetophenone and dimethylphenyl carbinol and containing, apart from this, only hydrocarbons and a little acetone, but substantially free from phenol, may be withdrawn from the top of the zone B at 5, which may afford advantages with regard to certain processes for the recovery of the acetophenone. This withdrawal may be effected from the decanting plate $o$ shown in the drawing.

It is also possible to withdraw from a decanting plate situated below the decanting plate $o$ a product which has a higher acetophenone content but which contains a percentage of phenol. Since simple processes exit for the separation of the acetophenone from phenol, it may in some cases be preferable to withdraw a mixture of high acetophenone content, but containing phenol, rather than a mixture having a relatively low acetophenone content, which is free from phenol but which has a high hydrocarbon concentration.

Finally, a mixture containing the phenol and possibly water, all the products of high boiling point, cumyl phenol and polymers of methylstyrene, and all or part of the acetophenone and of the dimethylphenyl carbinol, according to the efficiency of the extraction of acetophenone and dimethylphenyl carbinol from the decanting plate $o$, flows from the bottom of the column at 6.

According to a preferred form of the invention the constituents of the aqueous-hydrocarbon azeotropes are withdrawn from two different decanting plates separated by a number of ordinary plates. Thus, the organic layer containing the hydrocarbons is withdrawn from the decanting plate $m$, and a part of the aqueous layer is withdrawn from the decanting plate $n$. This arrangement has the advantage that it enables the lower layer not extracted from the decanting plate $m$, on the one hand to be freed from any last traces of phenol which might pass through the barrier zone B, and on the other hand to be better freed from acetone.

The process of the present invention not only makes it possible to obtain a substantially pure acetone and also cumene and methylstyrene which contain substantially no impurity other than acetone, but it affords a substantial economy in heat as compared with prior processes. Thus, a quantity of heat which is substantially the heat necessary to extract the acetone from the fission mixture serves also to effect the extraction of methylstyrene and cumene and to effect the substantial extraction of acetophenone and dimethylphenyl carbinol.

The number of plates and the degree of reflux at the top of the column may vary within wide limits. They depend upon the degree of purity required of the substances leaving the column. If a particularly high purity both of acetone and of hydrocarbons is desired, further purification may be effected in installations separate from the column.

The following examples will serve to illustrate the invention but are not to be regarded as limiting it in any way:

*Example I*

Into a plate-type column provided with two decanting plates $m$ and $n$ is introduced at 1 the reaction mixture obtained from the decomposition of cumene hydroperoxide by an acid, the said mixture containing phenol and acetone in equimolecular proportions, as well as 5.5% of cumene, 1.7% of methylstyrene, 1% of dimethylphenyl carbinol, 1.2% of acetophenone, a proportion of products having higher boiling points, and 10% of water.

850 calories per kg. of acetone to be separated are supplied to the bottom of the column by the evaporator V, and the charging of the upper zone with acetone is regulated so as to establish at the level of the decanter $m$ a zone rich in aqueous-hydrocarbon azeotrope of characteristic boiling point.

A quantity of hydrocarbons corresponding to the quantity introduced at 1 is decanted and withdrawn through the pipe 3 of the decanting plate $m$ in the form of a mixture of 65% of cumene, 20% of methylstyrene, 14.5% of acetone and 0.1% of phenol. The water constituting the decanted lower layer is returned to the column. Such quantity of water is withdrawn from the lower layer on the decanting plate $n$ at 4 that the boiling temperature is adjusted to 120° C. The withdrawn water contains only 500 parts per million of phenol. The upper organic portion is returned from the decanting plate $n$ into the column. A small quantity of a fraction containing a high proportion of odorous, coloured and reducing impurities is withdrawn at 7. This fraction represents a few thousandths of the quantity of acetone.

The phenol is withdrawn from the bottom of the column together with the acetophenone, the dimethylphenyl carbinol which has not been decomposed by the heat in the column, and the products of higher boiling point, with about 5% of water.

The acetone which is withdrawn from one of the last plates of the column at 2 has a concentration higher than 99%, the remainder consisting of water and traces of impurities, while the total aldehydes are equal to or less than 200 parts per million. The acetone reveals no trace of phenol even when tested by the most sensitive reactions.

*Example II*

The same product is treated in a column similar to that of Example I, but provided with an additional decanter $o$, and 1350 calories per kg. of acetone to be separated are supplied at the bottom.

In this case, a layer of hydrocarbons containing only 20 parts per million of phenol are obtained at the decanter $m$, while an aqueous solution containing only 100 parts per million of phenol is obtained at the decanter $n$. A mixture containing 8% of acetophenone, 1% of dimethylphenyl carbinol, 90% of hydrocarbons and less than 0.1% of phenol is withdrawn from the decanter $o$. The water decanted from this plate is returned into the column.

*Example III*

The same product as in Example II is treated in a column similar to that of Example II but provided with an additional decanter disposed lower than the decanter $o$, and the same number of calories is supplied to the base as in this example.

In this case, a layer of hydrocarbons containing only 20 parts per million of phenol is obtained at the decanter $m$, and an aqueous solution containing only 100 parts per million of phenol is obtained at the decanter $n$. There is withdrawn from the additional decanter situated below the decanter $o$ a mixture containing 22% of acetophenone, 1% of dimethylphenyl carbinol, 30% of hydrocarbons and 44% of phenol. The water decanted from this plate is returned into the column.

We claim:

1. A process for the separation of the decomposition products of cumene hydroperoxide containing phenol, acetone and other products including cumene, methylstyrene, dimethylphenyl carbinol and acetophenone which comprises continuously introducing said decomposition products at an intermediate point of a single distillation zone containing water, withdrawing substantially pure acetone from the head of the distillation zone, withdrawing a decantable mixture of the hydrocarbons and water at a point between the head of the distillation zone and the point of the inlet of the feed mixtures, said hydrocarbons being substantially free from phenol, the water constituent of the said mixture being returned to the distillation zone after decantation, withdrawing dimethylphenylcarbinol and acetophenone at points between the outlet of the hydrocarbons and the point of inlet of the feed mixture and withdrawing phenol substantially free from acetone, cumene and methylstyrene from the bottom of the distillation zone.

2. A process for the separation of the decomposition products of cumene hydroperoxide containing phenol, acetone and other products including cumene, methylstyrene, dimethylphenyl carbinol and acetophenone which comprises continuously introducing said decomposition products at an intermediate point of a single distillation zone containing water, withdrawing substantially pure acetone from the head of the distillation zone, separating the heterogeneous liquid mixture in the distillation zone at points between the head of the distillation zone and the point of inlet of the feed mixture into an organic layer and an aqueous layer, withdrawing the organic layer consisting of the hydrocarbons, substantially free from phenol, and withdrawing phenol with dimethylphenyl carbinol and acetophenone but substantially free from acetone cumene and methylstyrene from the bottom of the distillation zone.

3. A process for the separation of the decomposition products of cumene hydroperoxide containing phenol, acetone and other products including cumene, methylstyrene, dimethylphenyl carbinol, acetophenone and water which comprises continuously introducing said decomposition products at an intermediate point of a single distillation zone containing water, withdrawing substantially pure acetone from the head of the distillation zone, separating the heterogeneous liquid mixture in the distillation zone at points between the head of the distillation zone and the point of inlet of the feed mixture into an organic layer and an aqueous layer, withdrawing the organic layer consisting of the hydrocarbons, substantially free from phenol, withdrawing part of the aqueous layer and withdrawing phenol with dimethylphenyl carbinol and acetophenone but substantially free from acetone cumene and methylstyrene from the bottom of the distillation zone.

4. A process for the separation of the decomposition products of cumene hydroperoxide containing phenol, acetone and other products including cumene, methylstyrene, dimethylphenyl carbinol, acetophenone and water which comprises continuously introducing said decomposition products at an intermediate point of a single distillation zone containing water, withdrawing substantially pure acetone from the head of the distillation zone, separating the heterogeneous liquid mixture in the distillation zone at points between the head of the distillation zone and the point of inlet of the feed mixture into an organic layer and an aqueous layer, withdrawing the organic layer consisting of the hydrocarbons, substantially free from phenol, withdrawing part of the aqueous layer, separating the heterogeneous liquid mixture at points between the outlet of the aqueous layer and the inlet of the feed mixture into an organic layer and an aqueous layer, withdrawing the organic layer containing acetophenone and dimethylphenyl carbinol and withdrawing phenol substantially free from acetone, cumene and methylstyrene from the bottom of the distillation zone.

5. A process according to claim 2 wherein the separation of the heterogeneous mixture into two layers is effected inside the distillation zone on plates providing for the decantation of the layers and their outlet by separate routes.

6. A process according to claim 4 wherein the separation of the heterogeneous mixture into two layers is effected inside the distillation zone on plates providing for the decantation of the layers and their outlet by separate routes.

7. A process according to claim 2 wherein the separation of the heterogeneous mixture into two layers is effected inside the distillation zone on two different plates each providing for the outlet of a liquid layer formed thereon, said plates being separated by normal distillation plates, the organic layer being withdrawn from the upper said plate and the aqueous layer from the lower said plate.

8. A process according to claim 4 wherein the separation of the heterogeneous mixture into two layers is effected inside the distillation zone on two different plates each providing for the outlet of a liquid layer formed thereon, said plates being separated by normal distillation plates, the organic layer being withdrawn from the upper said plate and the aqueous layer from the lower said plate.

9. A process for the separation of the decomposition products of cumene hydroperoxide containing phenol, acetone and other products including cumene, methylstyrene, dimethylphenyl carbinol and acetophenone which comprises continuously introducing said decomposition products at an intermediate point of a single distillation zone containing water, withdrawing substantially pure acetone from the head of the distillation zone, withdrawing a decantable mixture of the hydrocarbons and water at a point between the head of the distillation zone and the point of the inlet of the feed mixtures, decanting said mixture into a hydrocarbon layer substantially free from phenol and a water layer, said water layer being returned to the distillation zone after decantation, and withdrawing phenol with dimethylphenyl carbinol and acetophenone but substantially free from acetone cumene and methylstyrene from the bottom of the distillation zone.

10. A process for the separation of the decomposition products of cumene hydroperoxide containing phenol, acetone and other products including cumene, methylstyrene, dimethylphenyl carbinol and acetophenone and at least 10% of water, which comprises continuously introducing said decomposition products at an intermediate point of a single distillation zone containing water, withdrawing substantially pure acetone from the head of the distillation zone, withdrawing a decantable mixture of the hydrocarbons and water at a point between the head of the distillation zone and the point of the inlet of the feed mixtures, decanting said mixture into a hydrocarbon layer substantially free from phenol and a water layer, withdrawing from the said water layer a quantity of water at least equal to the quantity introduced with the decomposition products and returning the remaining water to the distillation zone, and withdrawing phenol with dimethylphenyl carbinol and acetophenone but substantially free from acetone cumene and methylstyrene from the bottom of the distillation zone.

(References on following page)

References Cited in the file of this patent

UNITED STATES PATENTS

| | | |
|---|---|---|
| 2,597,497 | Joris | May 20, 1952 |
| 2,628,983 | Aller et al. | Feb. 17, 1953 |
| 2,702,784 | Rossi | Feb. 22, 1955 |

FOREIGN PATENTS

| | | |
|---|---|---|
| 496,061 | Belgium | June 15, 1950 |
| 512,889 | Belgium | Aug. 14, 1952 |
| 513,681 | Belgium | Sept. 15, 1952 |
| 504,447 | Canada | July 20, 1954 |
| 507,549 | Canada | Nov. 23, 1954 |
| 670,444 | Great Britain | Apr. 16, 1952 |

OTHER REFERENCES

"The Elements of Fractional Distillation," by Robinson and Gilliland, 3rd ed. (McGraw-Hill, 1939), pages 104–106.